March 1, 1960 R. P. FRANK 2,926,532
TRANSMISSION FOR TRACTOR POWER TAKE-OFF SHAFTS
Filed April 28, 1958
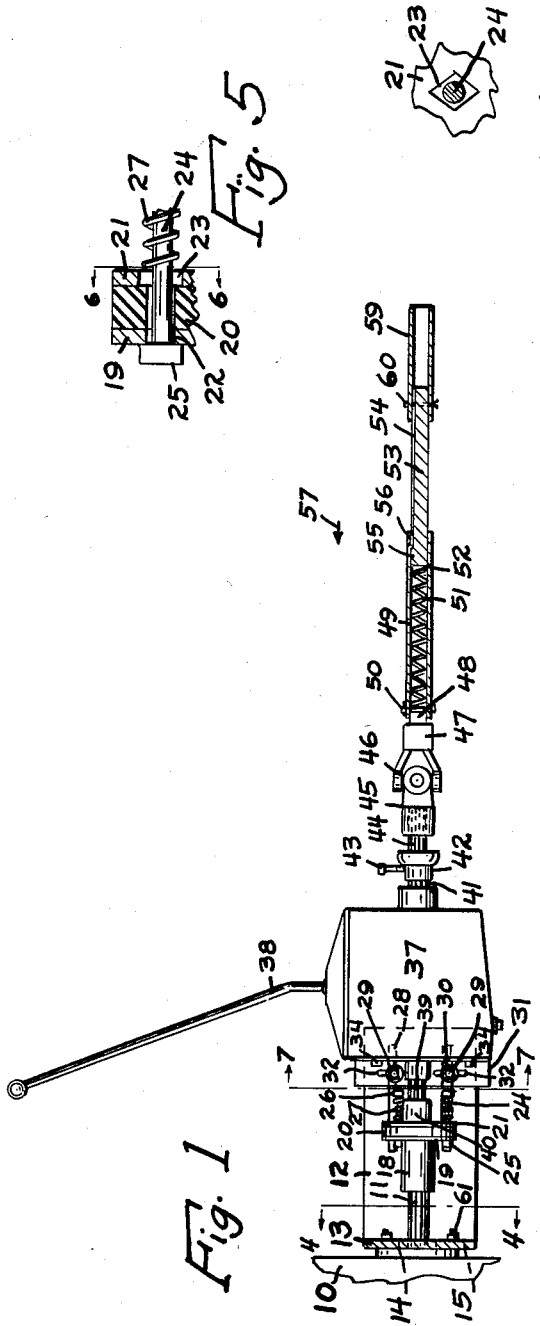
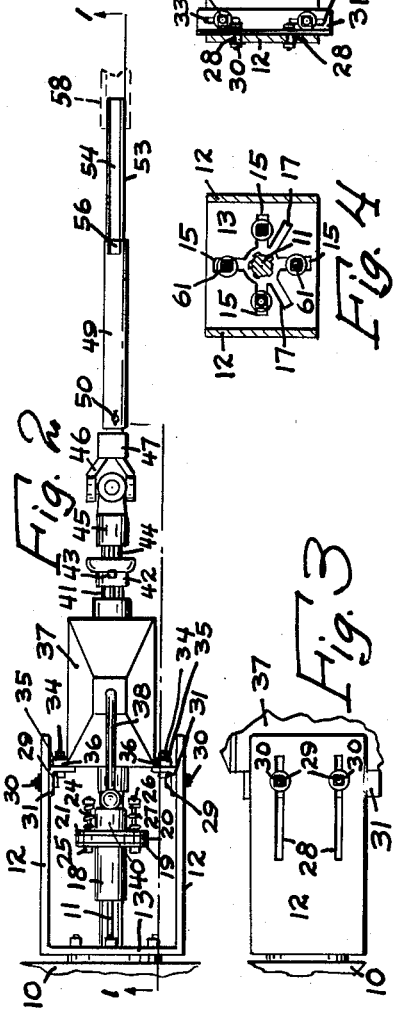
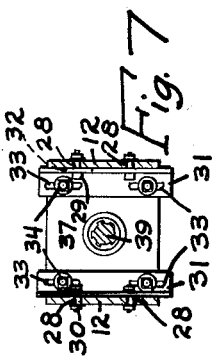
INVENTOR.
Reinhard P. Frank
BY
Sam J. Slotky
ATTORNEY United States Patent Office 2,926,532
Patented Mar. 1, 1960

2,926,532
TRANSMISSION FOR TRACTOR POWER TAKE-OFF SHAFTS

Reinhard P. Frank, Yankton, S. Dak.

Application April 28, 1958, Serial No. 731,219

5 Claims. (Cl. 74—15.4)

My invention relates to a transmission for tractor power take-off shafts.

An object of my invention is to provide an attachable arrangement which can be attached to the rear power take-off shaft of a tractor whereby the tractor will then include a plurality of other features which will render the tractor adaptable for a variety of purposes.

A further object of my invention is to provide such an arrangement which can be adjustably positioned both horizontally or vertically to accommodate any type of extending tractor shaft, and to also accommodate the transmission part of the arrangement to any vertical height consistent with the type of apparatus being driven, or to align the shaft properly.

A further object of my invention is to provide an arrangement wherein the transmission can be accommodated to different securing means on different tractors.

A further object of my invention is to provide a device in which the tractor shaft will be accommodated to the transmission shaft without a loss of efficiency, and wherein the power will be transmitted uniformly through a resilient coupling arrangement.

A further object of my invention is to provide an auxiliary attachment for the transmission shaft whereby the unit can be disassembled when required.

A further object of my invention is to provide a spring-urged resilient arrangement whereby the driving shaft can be lined up properly without danger to the operator, and whereby the power transmitting shaft can be adapted to different types of driven equipment.

A further object of my invention is to provide a safety feature in my arrangement, whereby the driven equipment can be readily reversed to dislodge material from the same, thereby providing a safety feature in that the operator will not need to leave the tractor to remove such material, wherein such removal would be dangerous.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view taken generally along the lines 1—1 of Figure 2 of my arrangement, Figure 2 is a plan view of Figure 1, Figure 3 is a side elevation of a portion of the device or arrangement, Figure 4 is a sectional view of Figure 1 taken along the lines 4—4 thereof, Figure 5 is an enlarged detail of the central circular plate and the means connected thereto, Figure 6 is a sectional view taken substantially along the lines 6—6 of Figure 5, and Figure 7 is a sectional view of Figure 1 taken along the lines 7—7 thereof.

My invention contemplates the provision of an all-purpose transmission arrangement for tractors which will provide a variety of advantages as above stated in the objects of my invention.

I have used the character 10 to designate the rear end of a tractor, the character 11 indicating the rear spline shaft.

In providing my invention I provide a substantially U-shaped member having the side walls 12, and the end wall 13. The end wall 13 (see Figure 4) includes a central opening 14, and extending from this opening 14 are a series of equally spaced four slots 15 adapted to accommodate the U-shaped bracket member to tractors having four stud or bolt attachments and also extending from the opening 14 are the two slots 17, which together with the upper vertical slot 15 provide means for accommodating the bracket to tractors having three stud or bolt attachments, so that in this way the entire unit can be accommodated to such different tractors.

The central opening 14 is large enough to accommodate any of the usual sizes of tractor shafts, and the character 18 designates a spline socket which receives the spline shaft 11, the socket 18 being attached to a plate 19 which bears against a resilient central circular plate 20, which plate 20 in turn bears against a further plate 21. The plate 19 includes the round openings 22, and the plate 21 includes the diamond-shaped openings 23 (see Figures 5 and 6), this diamond shape permitting freer lateral or vertical movement of the bolts 24 having the heads 25, these bolts terminating in the nuts 26 threadably engaged therewith, and positioned between the nuts 26 and the plate 21 are the springs 27 which receive the bolts 24, this arrangement providing means whereby the power will be transmitted smoothly from the shaft 11 to the transmission shaft regardless of slight angularity, etc.

The side walls 12 of the U-shaped bracket include the horizontal lengthened slots 28 through which are received the bolts 29 to which are attached the washer and nut assemblies 30, the heads of the bolts 29 bearing against the vertically positioned angle members 31, which angle members in turn have the vertically positioned slots 32.

The angle members 31 also include the further slots 33 (see Figure 7) through which pass the bolts 34, the bolts 34 terminating in the bolt assemblies 35 (see Figure 2), these bolts 34 serving to pass through the lugs 36 which are attached to the gear box or gear casing 37, and extending out of the casing 37 is the shift lever 38.

The casing 37 includes a standard transmission gearing which will include a reverse gear and three forward speeds, and it is not necessary herein to describe this transmission since it can be of any well-known type of this character. Connected to this transmission is a further spline shaft 39 which is received within a spline socket 40 which is attached to the plate 21. Also driven by the transmission gearing in the casing 37 is a further spline shaft 41 which is received within a further auxiliary socket 42 which I provide, and which can include a lock nut 43, the socket 42 including a further spline portion 44 attached thereto, which arrangement will thereby permit its assembly or dis-assembly without affecting the transmission shaft, the spline 44 passing within a further spline socket 45 which is a part of the universal joint member 46, and attached to the universal joint is a hollow square portion 47 including the male portion 48 extending therefrom.

The character 49 designates a square hollow tube which receives the portion 48 and is attached thereto by means of the pin 50, and received within the hollow member 49 is a helical compression spring 51, the spring 51 bearing at 52 against a male square portion 53 having the groove 54, the groove 54 terminating in the end lug portion 55 which is adapted to bear against the inwardly pressed portion 56 of the square member 49, this arrangement providing means to limit outward movement of the member 53.

It will be obvious from the foregoing description that by merely loosening the bolts 29, the transmission arrangement described can be accommodated to any length of spline shaft 11, so that in this manner regardless of the length of this extending shaft, the transmission can be accommodate thereto by merely sliding the bolts 29 along the slots 28 and re-tightening.

Also, when it is desired to adjust the transmission casing 37 to any vertical height consistent with the type of apparatus which is to be driven such as a corn picker or the like, this can be done by merely loosening the bolts 29 whereby the slots 32 will permit the bolts to be raised or lowered, and also by loosening the bolts 34, these bolts can be raised or lowered within the slots 33 to obtain an additional vertical movement, so that in effect by means of the U-shaped bracket member 12, 13 and the slots above mentioned, any horizontal or vertical adjustment can be provided. The resilient connection involving the plates 19 and 21 together with the resilient member 20 provides means for insuring a smooth transfer of power from the shafts without undue vibration or distortion. The spring 51 provides an important function in that the square shaft 53 can be pushed inwardly in the direction of the arrow 57 (see Figure 1) when aligning this shaft with any hollow square attachment such as the attachment 58 shown by the dotted lines in Figure 2, since by merely releasing the shaft 53, it will be spring urged within the socket member 58, thereby preventing danger to the operator, since usually without such an arrangement, the operator would necessarily have to align both ends of the shaft 53, whereas in the present instance this can be accomplished more easily.

The character 59 in Figure 1 illustrates a square hollow shaft which can be attached by means of the pin 60 to the shaft 53 in case it is desired to accommodate an apparatus having a male square rod, which rod can be received in the member 59, so that in this manner any attachment can be provided.

It will also be obvious that by merely shifting the lever 38 to reverse the operator can reverse the picker or other mechanism to dislodge caught or stuck material, without leaving the seat, thereby providing the advantage of a safety feature.

The character 61 indicates the various studs and nuts used for attaching the bracket 12, 13 to the rear of the tractor.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A transmission for tractor power take-off shafts comprising, a substantially U-shaped bracket adapted to be attached to the rear of a tractor, said U-shaped bracket having an opening through which the rear power take-off spline shaft of said tractor passes, said U-shaped bracket having side horizontally positioned slots, a pair of vertical angles, bolts passing through said angles and said slots, said angles having further vertically positioned slots receiving said bolts, said transmission unit being attached to said angles, means for vertically adjustably positioning said transmission unit with respect to said angles, positioning of said bolts in said slots providing means whereby said transmission can be accommodated to tractor rear power take-off shafts of varying lengths.

2. A transmission for tractor power take-off shafts comprising, a substantially U-shaped bracket adapted to be attached to the rear of a tractor, said U-shaped bracket having an opening through which the rear power take-off spline shaft of said tractor passes, said U-shaped bracket having side horizontally positioned slots, a pair of vertical angles, bolts passing through said angles and said slots, said angles having further vertically positioned slots receiving said bolts, said transmission unit being attached to said angles, means for vertically adjustably positioning said transmission unit with respect to said angles, positioning of said bolts in said slots providing means whereby said transmission can be accommodated to tractor rear power take-off shafts of varying lengths, said transmission unit including a forward shaft, a coupling to which said forward shaft is connected, said coupling being attached to said tractor shaft, said coupling including a plurality of circumferentially spaced bolts, springs receiving said bolts, nuts attached to said bolts against which said springs bear, said coupling including a pair of spaced plates, a resilient disc secured between said plates, one of said plates having substantially diamond-shaped openings for receiving said bolts.

3. A transmission for tractor power take-off shafts comprising, a substantially U-shaped bracket adapted to be attached to the rear of a tractor, said U-shaped bracket having an opening through which the rear power take-off spline shaft of said tractor passes, said U-shaped bracket having side horizontally positioned slots, a pair of vertical angles, bolts passing through said angles and said slots, said angles having further vertically positioned slots receiving said bolts, said transmission unit being attached to said angles, means for vertically adjustably positioning said transmission unit with respect to said angles, positioning of said bolts in said slots providing means whereby said transmission can be accommodated to tractor rear power take-off shafts of varying lengths, said bracket opening including two pairs of slots substantially at right angles to each other and extending from said opening for providing attachment for a four-point tractor attaching unit, further slots extending from said opening to provide means for a three-point tractor attaching unit.

4. A transmission for tractor power take-off shafts comprising, a substantially U-shaped bracket adapted to be attached to the rear of a tractor, said U-shaped bracket having an opening through which the rear power take-off spline shaft of said tractor passes, said U-shaped bracket having side horizontally positioned slots, a pair of vertical angles, bolts passing through said angles and said slots, said angles having further vertically positioned slots receiving said bolts, said transmission unit being attached to said angles, means for vertically adjustably positioning said transmission unit with respect to said angles, positioning of said bolts in said slots providing means whereby said transmission can be accommodated to tractor rear power take-off shafts of varying lengths, said transmission including a rear shaft, an auxiliary coupling attached to said rear shaft, a universal joint attached to said auxiliary coupling, a hollow square shaft attached to said universal joint, a spring received in said hollow square shaft, a male shaft received in said hollow shaft and adapted to be compressed against said spring.

5. A transmission for tractor power take-off shafts comprising, a substantially U-shaped bracket adapted to be attached to the rear of a tractor, said U-shaped bracket having an opening through which the rear power take-off spline shaft of said tractor passes, said U-shaped bracket having side horizontally positioned slots, a pair of vertical angles, bolts passing through said angles and said slots, said angles having further vertically positioned slots receiving said bolts, said transmission unit being attached to said angles, means for vertically adjustably positioning said transmission unit with respect to said angles, positioning of said bolts in said slots providing means whereby said transmission can be accommodated to tractor rear power take-off shafts of varying lengths, said transmission including a rear shaft, an auxiliary coupling attached to said rear shaft, a universal joint attached to said auxiliary coupling, a hollow square shaft attached to said universal joint, a spring received in said hollow square shaft, a male shaft received in said hollow shaft and adapted to be compressed against said spring, means for providing selective male and female attachments to said male shaft.

References Cited in the file of this patent

UNITED STATES PATENTS 2,672,056     Stone _____ Mar. 16, 1954